United States Patent Office.

DAVID STEWART, OF KITTANNING, PENNSYLVANIA.

*Letters Patent No.* 72,335, *dated December* 17, 1867; *reissue No.* 3,553, *dated July* 13, 1869.

IMPROVEMENT IN THE MANUFACTURE OF IRON.

The Schedule referred to in these Letters Patent and making part of the same.

*To all whom it may concern:*

Be it known that I, DAVID STEWART, of Kittanning, in the county of Armstrong, and State of Pennsylvania, have invented a new and useful Improvement in the Manufacture of Iron; and I do hereby declare the following to be a full, clear, and exact description thereof.

My invention consists in an improved method of treating iron, as it comes from the blast-furnace, or remelted pig-iron, to remove therefrom the silica, sulphur, phosphorus, and other impurities which are found in the iron, and which are not removed from, or have been contracted by the iron by the process of reduction from the ore.

It is well known that pig-iron, or iron from the blast-furnace, contains a large amount of impurities, which it receives in the process of reduction, and which must be more or less completely removed, in order to produce wrought-iron or steel.

Carbon has a great affinity for oxygen, and as the union of carbon and oxygen, at a sufficient temperature to produce combustion, evolves a great amount of heat, it follows that by mixing oxygen with molten pig-iron, the carbon ignites with vivid combustion, and the increase of heat thereby obtained renders the iron more fluid, and obviates the necessity of using other fuel or fire than is furnished by the carbon contained in the molten iron.

The most approved mode of accomplishing this object, heretofore introduced into practice, is to pour the melted metal from the blast-furnace into a receiver or vessel, through which a stream of atmospheric air is forced at sufficient pressure.

This, known as the "pneumatic process," is attended with the use of very expensive apparatus and machinery, and, moreover, requires to be closely watched, as the operation, if continued too long, injures the metal; besides, it is not effectual in removing the impurities, such as silicon, sulphur, phosphorus, &c.; and, even as respects the removal of these impurities, its operation is not always satisfactory, as it is difficult to secure the equal action of the oxygen on all the particles of iron in the receiver.

My improvement produces a much more satisfactory result, with little or no special apparatus, and produces immediately from the molten pig-metal granules of partial wrought-iron, which may be at once taken and worked in any known manner for forming it into blooms, ingots, bars, or other forms of merchantable iron or steel.

My improvement consists in subjecting the molten pig-metal or iron, direct from the blast-furnace, to the action of oxygen, (in any convenient shape, as atmospheric air, ozone, or other vapor or gas-containing oxygen,) by passing the molten metal in a stream or shower, either poured or forced upwards or sideways, to as to secure an intimate admixture of the particles of iron with the oxygen, or other oxygen-bearing gas or vapor.

In order to carry this into effect, no special apparatus is required; indeed, each manufacturer will probably vary the arrangement of his furnace to suit the mode of accomplishing the desired result, which will best suit his convenience or the requirements of his business.

In order to enable others skilled in the art to carry my invention into practical operation, I will proceed to describe one of the modes in which I propose to effectuate my purpose.

The melted iron may be run directly out of the tap-hole of the blast-furnace, or may be first poured out into a pot. It is then allowed to run, from an elevation of forty feet, more or less, to the ground, and by this means the iron is brought into intimate contact with the air, so that the carbon is rapidly ignited, increasing the temperature of the metal and its fluidity, and at the same time carrying off, in a great measure, the impurities, such as silicon, sulphur, and phosphorus, which also ignite with the carbon, and are thus eliminated. If it is desired to prevent the metal becoming spattered around as it falls, when it reaches the ground it may be poured through a pipe, cylinder, or tube, open at both ends, so as to permit the free passage of the air upward through the cylinder. This plan has the advantage of securing a more uniform current of air, which will flow upward through the cylinder, in consequence of the rarefaction caused by the heat of the metal. A stream or current of atmospheric air, either hot or cold, or steam, singly or combined, may be introduced into the cylinder, pipe, or tube through which the metal is poured; and, if desired, pressure may be applied, so as to create a stronger current or blast up through the cylinder. If it is desired to add any fluxes to the iron, (or physic it, as the iron-workers term it,) this may be done before the iron is poured out. The height from which the metal is caused to fall, may be varied according to the quality of the metal, and also somewhat according to its quantity, as the more impure the iron, the greater the height from which it should fall, the consequent distance through which it should be exposed to the action of the air, or other oxygen-bearing gas or vapor; and the larger the quantity, the greater the height should be, so as to secure the more complete action on the particles of iron. A more complete separation of the particles of metal may be secured by pouring it through holes or perforations in a plate, or otherwise. Instead of pouring the metal downward, the same result would be produced by an upward jet. But the plan above indicated will be found the simplest in practice.

By the means above described, by pouring molten pig-metal through a cylinder forty feet high, I have produced iron which, when heated and passed through the squeezers, gave but little cinder, thus showing that the silica and other impurities had been nearly, if not entirely removed, and which was ready to be worked for any desired purpose. So that, by my process, wrought-iron is produced directly from pig-iron, by a process requiring little or no machinery or apparatus, and but little time and labor.

I also apply the above mode of purifying iron to the manufacture of semi-steel and steel, the process being the same, though a more perfect and longer-continued admixture of air, or other oxygen-bearing gas, may be required therefor, and such application I include in my invention.

I do not claim, broadly, the use of steam in the process above described, nor do I claim, broadly, granulating iron by pouring it.

Having thus described my improvement,

What I claim as my invention, and desire to secure by Letters Patent, is—

Purifying pig-iron or blast-furnace metal, and converting it into granules of partially-wrought iron, by passing it in a stream through atmospheric air, or other oxygen-bearing gas or vapor, substantially as herein described, and for the purpose set forth.

DAVID STEWART.

Witnesses:

JAMES J. JOHNSTON,
GEO. H. THOMAS.